United States Patent
Benoit et al.

(10) Patent No.: US 6,452,139 B1
(45) Date of Patent: Sep. 17, 2002

(54) METHOD OF JOINING METAL COMPONENTS

(75) Inventors: Robert L. Benoit, Oakdale, NY (US); John A. Dickson, Newton Square, PA (US); Anthony Mascolo, Islip Terrace, NY (US); Bernard I. Rachowitz; Glenn L. Spacht, both of Lloyd Neck, NY (US)

(73) Assignee: Fuel Cell Components and Integrators, Inc., Hauppauge, NY (US)

( * ) Notice: Subject to any disclaimer, the term of this patent is extended or adjusted under 35 U.S.C. 154(b) by 0 days.

(21) Appl. No.: 09/563,162

(22) Filed: May 1, 2000

(51) Int. Cl.[7] ............................................... B23K 13/01
(52) U.S. Cl. ..................... 219/617; 219/608; 285/288.1
(58) Field of Search ................................ 219/617, 611, 219/603, 607–608, 610, 614, 615, 616, 544, 535; 156/304.2; 285/21.2, 41, 228.1; 228/114.5, 232, 262.5; 29/890.043; 148/520, 521, 525, 535; 72/342.1, 56

(56) References Cited

U.S. PATENT DOCUMENTS

| | | | | |
|---|---|---|---|---|
| 2,798,141 A | * | 7/1957 | Longacre | 219/611 |
| 3,258,573 A | * | 6/1966 | Morin et al. | 219/608 |
| 3,985,280 A | * | 10/1976 | Yamaji et al. | 228/11.5 |
| 4,150,274 A | * | 4/1979 | Minin et al. | 219/610 |
| 4,331,280 A | * | 5/1982 | Terabayashi et al. | 228/114.5 |
| 4,513,188 A | * | 4/1985 | Katzenstein | 219/617 |
| 5,549,335 A | * | 8/1996 | Wohrstein | 285/288.1 |

FOREIGN PATENT DOCUMENTS

JP 10305370 * 11/1998

* cited by examiner

Primary Examiner—Teresa Walberg
Assistant Examiner—Quang Van
(74) Attorney, Agent, or Firm—Salzman & Levy

(57) ABSTRACT

A process for joining high strength metal components by electromagnetic forming techniques. One of the metal components carries high loads or is subjected to combined stresses and strains, thus requiring that it be relatively strong and ductile. EMF or MPW processes are used to join the components, the strength of which is temporarily diminished prior to the joining step. The high strength material is subjected to a retrogressive heating and quenching process along a joined boundary thereof; then electromagnetically joined; and thereafter, the strength of the diminished material is restored to its higher temper and strength.

24 Claims, 1 Drawing Sheet

Figure 1
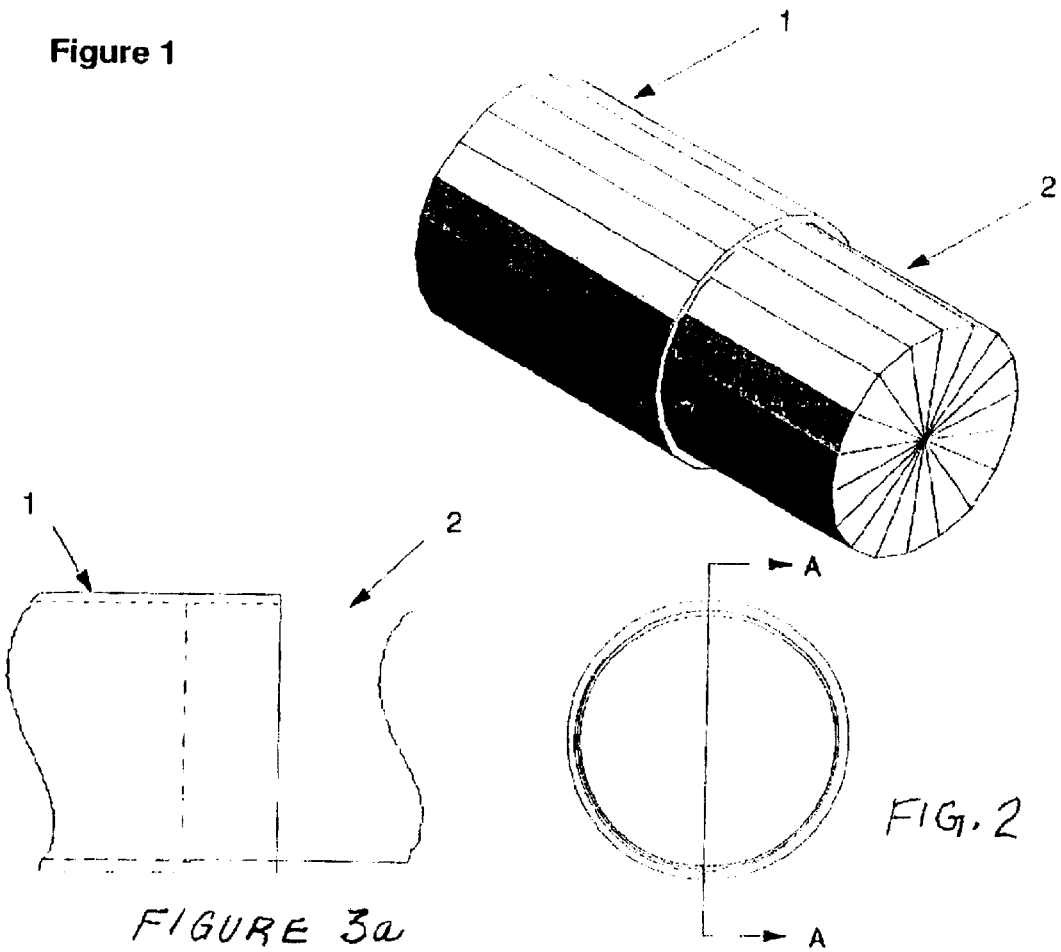
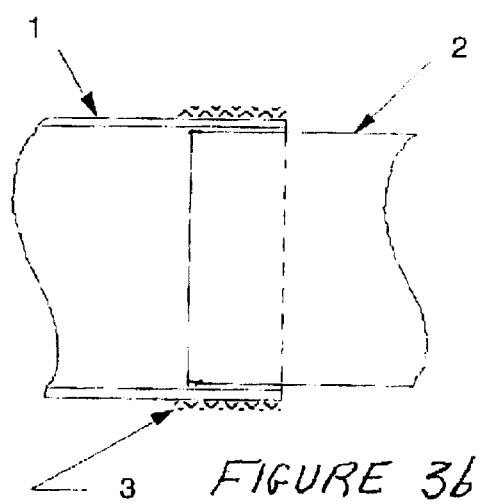
FIGURE 3a
FIG. 2
FIGURE 3b
Section A-A

METHOD OF JOINING METAL COMPONENTS

FIELD OF THE INVENTION:

The present invention relates to fabricating processes for joining metal components and, more particularly, to a technique of joining metal components by utilizing retrogressive heat and magnetic bonding techniques.

BACKGROUND OF THE INVENTION

It is often desirable to join lightweight aluminum alloy tubes to aluminum or steel fittings for the purpose of transmitting torque or axial forces. It is desirable to employ steel end fittings in some cases, because of the great applied forces. For example, the forward end of a torque transmitting driveshaft is splined. The spline is inserted into the aft end of the transmission. It slides in and out of the transmission during the course of the normal shifting operation, while the suspension of the automobile moves up and down. The combined torque and vertical movement increases stress and strain upon the spline, therefore making steel often the preferred choice of material. Steel is also significantly less expensive than aluminum. Where weight is of primary importance, however, aluminum end fittings which are one third the weight of steel are used.

Aluminum cannot be joined to steel using conventional welding methods. Other methods have proven to be difficult and expensive to attach an aluminum tube to a steel end fitting in most applications that require significant loads and torque. Bonding, friction welding, and mechanical fastening have been employed with various degrees of success, but the joined materials generally have a shortened operational life. Conventional welding can be used to join aluminum tubes to aluminum end fittings but because heat is inherent in the process, distortion and localized annealing or weakening of the aluminum tube occurs. This requires that the tube is thickened to compensate for this effect. This results in a heavier, more expensive assembly.

The present invention reflects the discovery of a method of accomplishing the joining of both similar and dissimilar metals by a new electromagnetic attachment of the tube to the fitting. Electromagnetic forming (EMF) or magnetic pulse welding (MPW) has been used in the past with some success, where the materials are not required to carry high or combined load forces. In these processes, electromagnetic fields are created around the tube which create an opposing field in the tube. The two fields repel one another, causing the tube to deform inwardly onto the end fitting.

With the use of MPW, the tube forms a molecular bond with the end fitting. In the case of EMF, a mechanical joint is formed, which deforms the tube into a groove pattern disposed in the end fitting. The electrical energy required to perform the MPW or EMF processes successfully, in order to join metals, increases as the yield strength of the material increases. Therefore, a problem arises when the metal being deformed is high strength aluminum. In addition, the ductility of the material generally decreases as yield strength increases, making it still more difficult to form a successful EMF or MPW joint using high strength aluminum alloys, such as 6061-T6, 6013-T6, 2024-T3, or metal matrix composite.

In order to join a high strength aluminum tube to an aluminum or steel fitting, the inventive process subjects the aluminum tube to local regressive heat treatment (RHT), prior to electromagnetic deformation. In other words, the aluminum is subjected to inductive heating prior to the electromagnetic forming or magnetic pulse welding. The RHT process involves elevating the temperature of the material to approximately one thousand degrees Fahrenheit and then quenching the aluminum in water. The regressive heat treatment reduces the yield strength of the tube, while increasing its ductility for a period of several hours. The aluminum, which has been subjected to the RHT process gradually regains its temper. Eventually, the aluminum tube develops properties greater than T4 aluminum, but less than those of T6 aluminum. The strain induced in the material by the EMF and MPW processes locally increases the temper of the material, due to work hardening. After the EMF or MPW process, the material may be subjected to additional heat or an aging process in order to increase the temper of the tube to a final, higher temper value.

During the inductive heating process, it has been noted that the hardness readings about the circumference of the tube are not uniform. Consistent hardness in the heated zone is critical to a consistent welded or formed part. Rotating the tube in the induction-heating coil either manually or preferably using a motorized fixture obtains uniform hardness readings.

DISCUSSION OF RELATED ART

In U.S. Pat. No. 3,603,759, issued on Sep. 7, 1971 to Peacock, for WELDING AND FORMING METHOD, magnetic forces are utilized to force members together at an interface.

In U.S. Pat. No. 3,944,641, issued to Lemelson on Mar. 16, 1976, for PROCESS OF FORMING AN IRREGULAR SURFACE ON THE INSIDE OF A TUBE OR PIPE, an apparatus and method are illustrated for providing the inside of a pipe with an irregularly shaped surface. An inner liner of the pipe is extruded or subjected to an electromagnetic field, in order to vary the surface configuration or roughness of the internal surface. In U.S. Pat. No. 5,218,763, issued on Jun. 15, 1993 to Marker et al, for METHOD FOR MANUFACTURING A SWAGED PISTON ASSEMBLY FOR AN AUTOMOBILE AIR CONDITIONING COMPRESSOR, a 1018 steel alloy connecting rod is fabricated with an aluminum alloy head. Cold swaging is used to flare the tip of the connecting rod outwardly, in order to conform and fill a counterbored surface. This provides a strong attachment joint between the parts.

SUMMARY OF THE INVENTION

In accordance with the present invention, there is provided a method by which similar or dissimilar metal components can be joined together. The metal components carry high loads, or are subjected to combined stresses and strains, thus requiring the use of high strength materials. Electromagnetic forming or magnetic pulse welding when used to join the components, cannot be accomplished easily when the materials have high yield strength and ductility. Therefore, in order to electromagnetically form or magnetic pulse weld these high strength materials, the high strength material is temporarily diminished prior to the joining step. The high strength material is subjected to a retrogressive heating and quenching process, prior to the joining process. This retrogressive heat treatment (RHT) reduces its ductility and yield strength. Thereafter, the material is restored to its higher temper and strength by work hardening and subsequent heat or aging processes.

During the retrogressive heat treatment, while the tube is in the inductive heating coil, the tube may be rotated to improve the consistency of the tube temper around the circumference of the tube in the RHT area.

It is an object of this invention to provide an improved process of joining similar or dissimilar metals using electromagnetic forming or magnetic pulse welding.

It is another object of the invention to provide a process of joining high strength components by moderate electromagnetic forces.

BRIEF DESCRIPTION OF THE DRAWINGS

A complete understanding of the present invention may be obtained by reference to the accompanying drawings, when considered in conjunction with the subsequent detailed description, in which:

FIG. 1 illustrates a perspective, schematic view of two cylindrical components that have been joined together at a boundary by the process of this invention. The cylindrical components comprise an aluminum tube that has been inserted into, and joined with a fitting;

FIG. 2 depicts an end view of the joined components of FIG. 1;

FIG. 3a shows a sectional view of the two cylindrical components taken along lines A—A of FIG. 2; and FIG. 3b illustrates the components of FIG. 3a, having a boundary portion that is subjected to local regressive heat treatment.

DESCRIPTION OF THE PREFERRED EMBODIMENT

Generally speaking, the invention features a process for joining similar or dissimilar, high strength metal components by electromagnetic forming techniques. The metal components carry high loads or are subjected to combined stresses and strains, thus requiring that they be relatively strong and ductile. EMF or MPW processes are used to join the components, whose strength is temporarily diminished prior to the joining step. The high strength material is subjected to a retrogressive heating and quenching process along a joined boundary thereof; then the material is electromagnetically joined; and thereafter, the strength of the materials at the boundary is restored to its higher temper and strength.

During the RHT process, to achieve a more consistent strength reduction about the circumference of the tube, the tube may be rotated either manually or by a motorized fixture.

Now referring to FIGS. 1 through 3a, an aluminum tube 1 is joined with an aluminum or steel fitting 2 by a successful EMF or MPW joint, using high strength aluminum alloys, such as 6061-T6, 6013-T6, 2024-T3, or metal matrix composite. The aluminum tube 1 is subjected to local regressive heat treatment (RHT) prior to electromagnetic deformation.

The aluminum tube 1 is subjected to inductive heating along a joining boundary layer 3, as shown in FIG. 3b, prior to the electromagnetic forming. The RHT process involves elevating the temperature of the material to approximately one thousand degrees Fahrenheit, and then quenching the aluminum in water. The regressive heat treatment reduces the yield strength of tube 1, while increasing its ductility for a period of several hours. The aluminum, which has been subjected to the RHT process, gradually regains its temper.

Eventually, the aluminum tube 1 develops properties greater than T4 aluminum, but less than those of T6 aluminum. The strain induced in the material by the EMF and MPW processes locally increases the temper of the material, due to work hardening. After the EMF or MPW process, the material may be subjected to additional heat or an aging process in order to increase the temper of the tube 1 to a final, higher temper value.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A method of joining two components together, comprising the steps of:
   a) subjecting one of said two components to a regressive temperature process to reduce its yield strength and ductility prior to joining said two components together by an electromagnetic process;
   b) joining said two components along a common boundary by one of at least two electromagnetic processes comprising electromagnetic forming and electromagnetic pulse welding; and
   c) increasing the temper of the temperature treated component of step (a).

2. The method of joining two components together in accordance with claim 1, wherein said electromagnetic process of steps (a) and (b) is an electromagnetic forming process.

3. The method of joining two components together in accordance with claim 1, wherein said electromagnetic process of steps (a) and (b) is a magnetic pulse welding process.

4. The method of joining two components together in accordance with claim 1, wherein said temper is increased in step (c) by an aging process.

5. The method of joining two components together in accordance with claim 1, wherein said temper is increased in step (c) by a work hardening process.

6. The method of joining two components together in accordance with claim 1, wherein said temper is increased in step (c) by an additional heat treating process.

7. The method of joining two components together in accordance with claim 1, wherein said two components are substantially tubular.

8. The method of joining two components together in accordance with claim 1, wherein said regressive temperature process of step (a) further comprises the steps of:
   (d) heating said one of said two components to a temperature of approximately one thousand degrees;
   (e) quenching said one of said two components.

9. The method of joining two components together in accordance with claim 8, wherein one of said components is rotated about its longitudinal axis in order to improve process consistency around the circumference thereof.

10. The method of joining two components together in accordance with claim 1, wherein said one of said two components comprises aluminum.

11. The method of joining two components together in accordance with claim 10, wherein said aluminum comprises 6013-T6, 6061-T6, or metal matrix composite aluminum.

12. The method of joining two components together in accordance with claim 10, wherein said aluminum comprises 2024-T3 aluminum.

13. The method of joining two components together in accordance with claim 1, wherein one of said components is rotated in order to enhance process consistency around the circumference thereof.

14. A method of joining a substantially tubular aluminum component to an aluminum or steel fitting, comprising the steps of:
   a) subjecting said tubular aluminum component to a regressive temperature process to reduce its yield strength and increase its ductility prior to joining said tubular aluminum component to said steel fitting by an electromagnetic process;
   b) joining said component and fitting along a common boundary by an electromagnetic process; and
   c) increasing the temper of the temperature-treated tubular aluminum component via strain hardening.

15. The method of joining said component and fitting together in accordance with claim 14, wherein said electromagnetic process of steps (a) and (b) is an electromagnetic forming process.

16. The method of joining said component and fitting together in accordance with claim 14, wherein said electromagnetic process of steps (a) and (b) is a magnetic pulse welding process.

17. The method of joining said component and fitting together in accordance with claim 14, wherein said temper is increased in step (c) by a work hardening process.

18. The method of joining said component and fitting together in accordance with claim 14, wherein said temper is increased in step (c) by an aging process.

19. The method of joining said component and fitting together in accordance with claim 14, wherein said temper is increased in step (c) by an additional heat treating process.

20. The method of joining said component and fitting together in accordance with claim 14, wherein said regressive temperature process of step (a) further comprises the steps of:

d) heating said aluminum component to a temperature of approximately one thousand degrees; and
   e) quenching said aluminum component.

21. The method of joining said component and fitting together in accordance with claim 20, wherein said tubular component is rotated about its longitudinal axis to improve process consistency around the circumference of the treated region.

22. The method of joining said component and fitting together in accordance with claim 14, wherein said aluminum comprises 6013-T6, 6061-T6, or metal matrix composite aluminum.

23. The method of joining said component and fitting together in accordance with claim 14, wherein said aluminum comprises 2024-T3 aluminum.

24. A method of joining two components together, comprising the steps of:
   a) subjecting a first component to a regressive temperature process to reduce its yield strength and ductility prior to joining said first component to a second component by an electromagnetic process;
   b) joining said first and second components along a common boundary by said electromagnetic process; and
   c) increasing the temper of said first, temperature treated, component.

* * * * *